Jan. 22, 1952 J. D. DONNA 2,583,293
TEMPERATURE PICKUP ELEMENT
Filed Feb. 21, 1949 2 SHEETS—SHEET 1

INVENTOR.
JOSEPH D. DONNA
BY
*George H Fisher*
ATTORNEY

Jan. 22, 1952 J. D. DONNA 2,583,293
TEMPERATURE PICKUP ELEMENT
Filed Feb. 21, 1949 2 SHEETS—SHEET 2
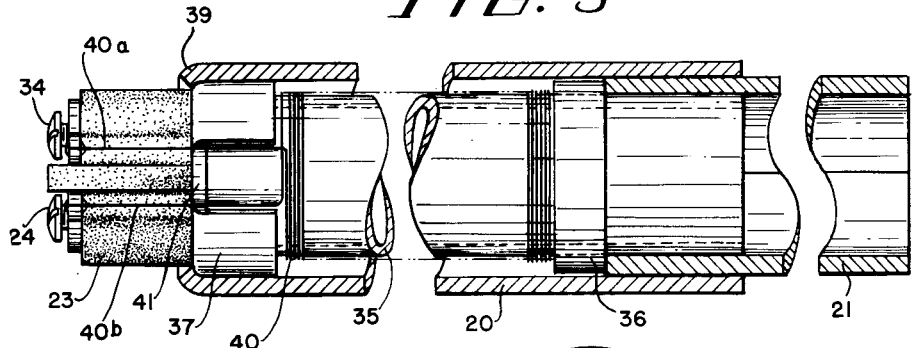
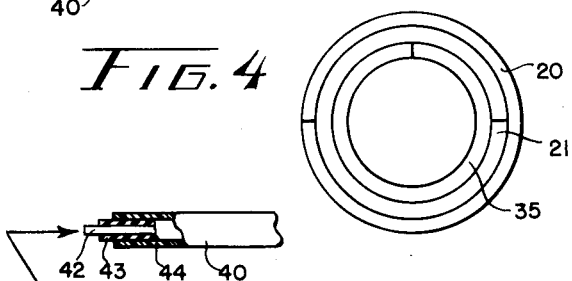
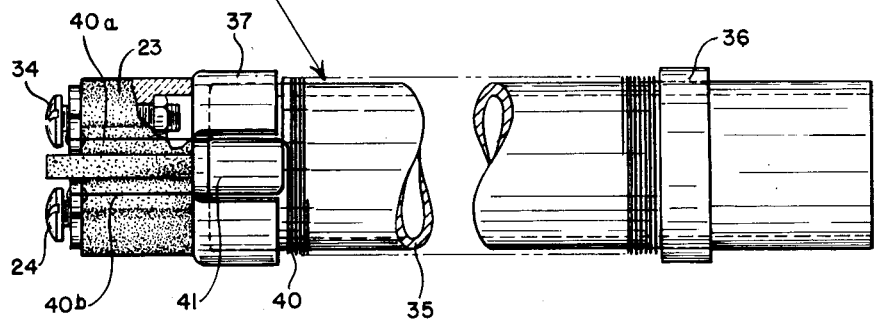
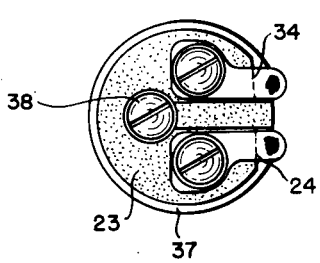
INVENTOR.
JOSEPH D. DONNA
BY
ATTORNEY Patented Jan. 22, 1952

2,583,293

UNITED STATES PATENT OFFICE 2,583,293

TEMPERATURE PICKUP ELEMENT

Joseph D. Donna, Minneapolis, Minn., assignor to Minneapolis-Honeywell Regulator Company, Minneapolis, Minn., a corporation of Delaware Application February 21, 1949, Serial No. 77,474

7 Claims. (Cl. 201—63)

1

The present invention is concerned with a temperature pickup element, and more particularly with that type of element which senses a relatively high temperature such as the temperature in the fire box of a stoker fired furnace.

In my copending application Serial No. 28,912, filed May 24, 1948, there is disclosed a stoker control using an electrical network with a resistance element therein whose temperature varies with changes in temperature of the stoker fire. The present invention discloses in detail a new temperature pickup element with a special temperature responsive resistance wire associated therewith which element is adapted for use with the apparatus of the type shown in detail in the abovementioned copending application.

A temperature pickup, to be utilized as the present invention is to be used, must be designed to withstand wide variations in temperature and must further be able to give an indication of a stoker fire box temperature up to 1500° F., at a particular reference point in the fire box. This type of element must further be very rugged in construction so that the resistance element will not be broken should the pickup element be struck a hard blow. Further, the ruggedness and mounting of the element must not affect the speed of response of the element to changes in the temperature of the stoker fire or else the apparatus with which such an element is used will not hold the controlled temperature within desired limits.

It is therefore an object of the present invention to provide a new and improved temperature pickup element which may be subjected to wide variations in temperature without causing damage to the element.

A further object of the present invention is to provide a new and improved temperature pickup element which is rugged in construction and is still capable of responding quickly to changes in temperature.

A still further object of the present invention is to provide a temperature pickup element having a temperature sensing resistance wire therein which has heat supplied thereto by heat radiation and heat conduction from a protecting and supporting member.

Another object of the present invention is to provide a temperature pickup element which is adapted to project through a panel which supports the element and which has supporting means which rigidly support the element in the panel and allow a minimum of heat loss to the panel and the thermal capacity of the panel will have a minimum affect upon the operation of the element.

Still another object of the present invention is to provide a new and improved temperature pickup element having a temperature sensing resistance wire wound thereon which when manufactured may be tightly wound on a portion of the element and upon being subjected to a certain amount of heat a covering layer on the wire will be vaporized off and will leave room for expansion and contraction of the wire as it is subjected to wide variations in temperature.

These and other objects of the present invention will be obvious upon considering the accompanying specification, claims and drawings of which:

Figure 3 is a cross sectional view of the main portion of the element;

Figure 4 shows a right end view of Figure 3;

Figure 5 shows the bobbin portion of the pickup element with the resistance wire wound thereon; and Figure 6 shows the end view of the terminal block shown in Figure 5.

Figure 1:
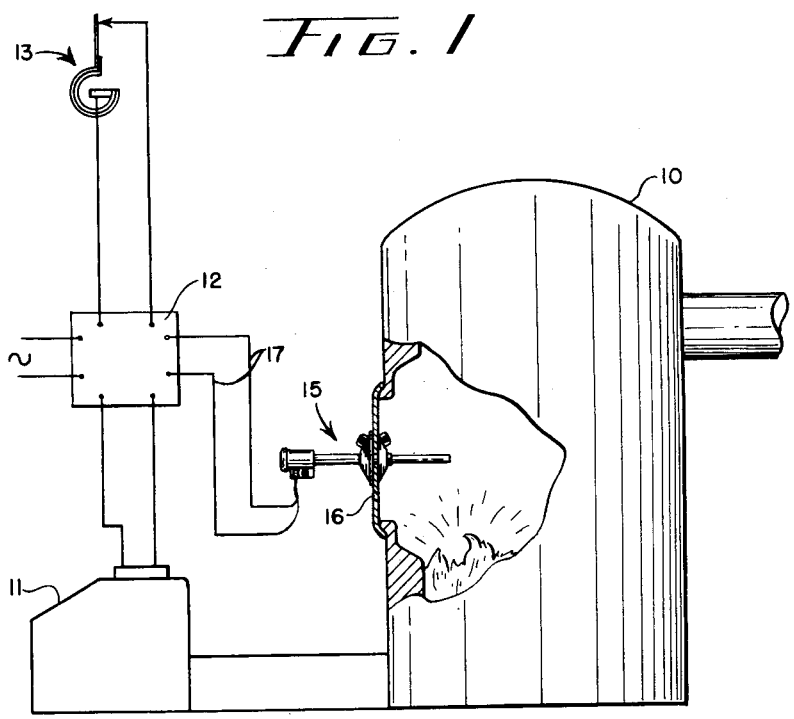
Figure 1 is a schematic showing of the present invention with a stoker fired boiler and the control circuits therefor.

Referring now to Figure 1, the number 10 represents a boiler of any suitable type which has air and fuel supplied thereto by a suitable stoker 11. The control circuits for the stoker 11 are located in a box indicated generally by the numeral 12. Located in a space whose temperature is being controlled is a suitable thermostatic device 13 which is operative to affect electrical circuits within the housing 12 and cause operation of the stoker 11 when the temperature of the space wherein the thermostatic device 13 is located drops below a predetermined control point. Sensing the temperature condition of the fire within the boiler 10 is a temperature pickup element 15 which is mounted on a fire door 16, on the boiler 10, so as to project through the fire door. The temperature sensitive portion of the element is located within element 15 and is electrically connected to the circuits located within housing 12 by suitable electrical conductors 17.

Operation of the element in the control apparatus for the stoker is such that the element 15 will, through the control circuits in housing 12, maintain the stoker fire within predetermined temperature limits depending upon the demand for heat indicated by the operation of the thermostatic device 13. The stoker fire, for example, may be maintained at approximately 150° F., when the thermostatic device has been inoperative for a long period of time. It will be understood the 150° temperature is a reference temperature taken at the end of element 15 with the element sealed off at the end. The 150° temperature will be sufficient to maintain combustion within the boiler 10 so that upon a subsequent demand for more heat by the thermostatic device, it will be but necessary to add additional fuel and air to the fire in order to cause an increase in temperature. The element 15 further serves to limit the temperature of the stoker fire to a predetermined maximum which may be, for example, approximately 1500° F. This maximum temperature may be reached when the thermostatic device 13 has been indicating the need for operation of the stoker over a long period of time. This latter controlling effect will prevent the temperature of the stoker fire from going above a temperature which will cause damage to the boiler 10. For a complete understanding of the operation of the subject temperature pickup element in the complete control system, reference should be made to the above-mentioned copending application.

Figure 2:
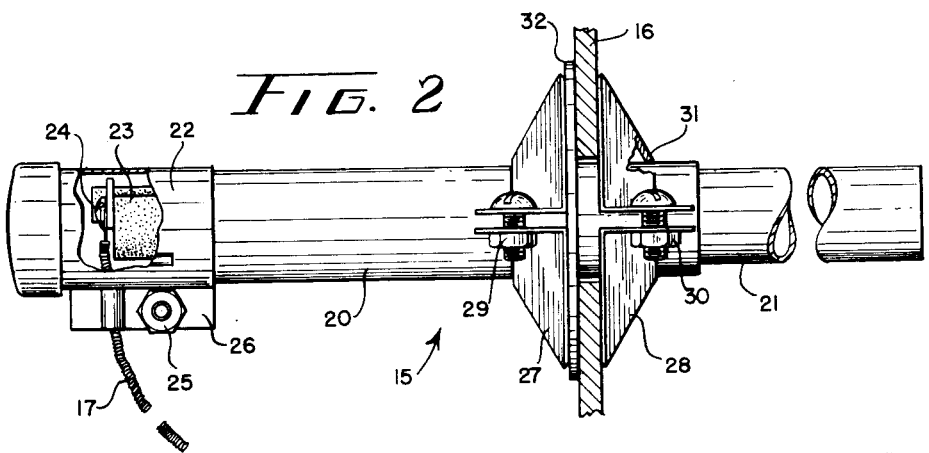
Figure 2 is a plan view of the elements of the present invention with portions thereof shown in section.

Referring now to Figure 2, the element 15 is shown in greater detail. The element 15 may be seen to comprise an outer metallic protecting member 20 which is cylindrical in construction and of good heat conductivity. This member is the main supporting member for the entire element and supports a further metallic cylindrical member 21 which is adapted to project into the area where the temperature is being measured. This member 21 may also be seen to be a hollow cylindrical member and of good heat conductivity. A cap or cover 22 is mounted over one end of the supporting member 20 and forms a protective covering for a terminal block 23 which is mounted on the end of element 20. As shown in Figure 2, the terminal block 23 has a terminal screw 24 which is provided for making an electrical connection to one conductor of the electrical cable 17 which is shown as a shielded cable. The cover 22 is fastened to the main supporting element 20 by tightening of the nut and bolt assembly 25 which is adapted to tighten an expansible portion 26 of the cover assembly 22. The tightening of the nut and bolt assembly 25 results in clamping the shielded cable 17 in position to prevent strain on the cable 17 being transmitted to the terminal screws.

The element 15 is mounted on the firedoor 16 or upon a panel of the boiler 10 by drilling or cutting with a torch a single hole through the panel 16. The diameter of this hole must of necessity be slightly larger than the outside diameter of the main supporting member 20. Retaining the element in the hole drilled in the panel 16 are a pair of clamping members 27 and 28. These members are identical in construction and are actually a pair of expansible frustro-conical members each having a tightening nut and bolt assembly 29 and 30 respectively.

In placing the element in position, the element 28 would preferably be fastened in approximately the desired position, depending on the particular installation, upon the supporting member 20 after the element has been inserted through the panel 16. As the tightening assembly 30 is tightened the opening of the conical member 28 will decrease in diameter and the inner edge thereof will grip the supporting element 20 at 31 and will prevent lateral movement of the member 28 upon the supporting member 20. A washer 32 is then placed against the opposite side of the panel 16. This washer 32 is provided to cover any irregularities in the hole drilled or cut with a torch in the panel 16 and the washer has an inside diameter that is slightly larger than the outside diameter of the supporting member 20. The conical member 27 is then pushed into position and is tightened by means of the tightening assembly 29. The tightening of the assembly 29 will have the effect of reducing the diameter of smaller opening of the conical member so that it will grip the supporting member 20 in the same way that the member 28 gripped the supporting member. After both of the members are tightened on the supporting member 20, continued tightening of the assemblies 29 and 30 results in the peripheries of members 27 and 28 moving against the panel 16 and exerting a compression force upon the panel member. These two opposing forces resulting from the tightening of the conical members 27 and 28 will result in the supporting member 20 being rigidly held in the panel 16. It will be seen that there is a minimum of heat conducting area between the element and the panel 16 with this type of mounting. This will prevent the thermal mass of panel 16 from having an adverse effect upon the speed of response of the element to the temperature of the stoker fire. This is especially important when there has been a period of long on time followed by a period of no heat demand, for the heat stored in the panel 16 must not affect element 15. If it does the actual fire temperature may drop below a point necessary to sustain combustion.

Referring now to Figure 3 where the element 15 is shown in still greater detail, it will be noted that the cylindrical member 21 is mounted with a portion of the supporting member 20 overlapping and surrounding the same. The member 21 may be retained within the supporting member 20 by any suitable fastening process such as spot welding or by a suitable brazing process such as copper brazing. Located within the supporting member 20 is a bobbin member 35 in the form of a further metallic hollow cylindrical member. The outside diameter of this bobbin member 35 is such as to fit snugly within the inside diameter of the element 21 so that there will be good heat conduction between the two. This bobbin member projects inside the element 21 a distance corresponding to the projection of the element 21 inside of the supporting member 20. The end view shown in Figure 4 shows the relative positions of the members 20, 21 and 35 with respect to each other.

The bobbin member 35 is shown in greater detail in Figure 5. Located on the outer portion of the member 35 are a pair of spacer elements 36 and 37. The spacer 36, rigidly mounted on the forward portion of the bobbin 35, surrounds the bobbin and prevents the same from moving forward within the member 21. This spacer may be fastened to the bobbin member 35 by spot welding or by a suitable brazing process. The spacer member 37 forms a cap for the bobbin and is rigidly fastened to the end of the bobbin 35 by either spot welding or by a brazing process. The spacer 37, in addition to maintaining the bobbin 35 in spaced relation to the supporting member 20, forms a mounting surface for the terminal block 23. This spacer member has a tapped hole therein, not shown, for threadedly engaging a screw 38, shown in Figure 6, which retains the terminal block in position.

When the bobbin member 35 is inserted inside of the supporting member 20 and the member 21, it is retained there by crimping down an end portion of the supporting member 20 at 39. The bobbin, when so mounted, will be rigidly retained within the supporting member 20 and will not move in a forward or rearward direction.

Tightly wound around the bobbin member 35 is a temperature sensitive resistance wire 40. This resistance portion of the element shown in either Figures 3 or 5, wound toward the right and back over the top of this original winding to the left. The ends of the resistance wire 40a and 40b are brought out through a recess 41 to the electrical terminals 24 and 34 on the terminal block 23. Wire 40, shown in enlarged section in Figure 5, at the time of manufacture, comprises an electrical resistance wire 42 preferably having, in its present application, a positive temperature coefficient of resistance. It may be comprised of an alloy of nickel and iron. Surrounding this resistance wire 42 is a double layer of glass fiber insulation. This glass fiber insulation is impregnated and covered with a suitable varnish or other resinous material 44 which aids in the handling of the wire 42 as it is wound about the bobbin member 35. This wire may be purchased commercially by specifying "Bare, double glass covered, enamel varnish treated, 'Balco' wire." No. 40 wire was the wire size used in one particular installation that worked very satisfactorily. When the resistance wire 40 is wound about the bobbin member 35 it is wound very tightly and closely so as to be evenly spaced over the bobbin member. After the element has been assembled and been exposed to the temperature of the fire, the heat will vaporize the varnish off the insulation 43 and the resistance wire with the insulation 43 therearound will be left loosely wound upon the bobbin member as there will be a space left about each portion of the wire upon the varnish being vaporized off. The temperature at which vaporization occurs is considerably lower than the breakdown temperature of the insulation 43. It is now possible for the wire to expand and contract with the changes in temperature of the element without putting undue strain on any particular portion of the wire. Attempts to wind unvarnished wire on the steel bobbin proved unsuccessful and resulted in broken strands in the wire when put in service.

When the unit is assembled substantially as is shown in Figure 3, or as in Figures 1 and 2, upon the member 21 being exposed to heat, the heat will be conducted through the member 21 to the supporting member 20 and to the bobbin member 35 all of which, as mentioned above, are tightly fit together for good heat conduction. This heat transfer will be by conduction through the metallic portions of the device and the resistance wire 40, wound about the bobbin 35, will be directly exposed to heat conducted through the bobbin member 35 and to heat radiated from the supporting member 20. The heat will also be transferred by heat convection through the hollow portions of member 21 and bobbin 35 directly within that portion about which the resistance wire 40 is wound.

The temperature of the resistance wire will be less than the actual fire box temperature and the temperature of the resistance wire will change directly with changes in fire box temperature. The reason that it will be less is that due to the fact that the heat conducted from member 21 to the supporting member 20 will be partially dissipated by heat radiation and convection from the outside surface of the member 20. This heat dissipation will vary with the surface temperature of the supporting member 20 and, the temperature of the resistance wire, at maximum fire box temperature, may be as much as 500° F., lower than the fire box temperature. Had not such an arrangement as the present one been provided it would be impossible to use control devices of the type shown in my copending application as no temperature sensing wires are commercially available capable of withstanding direct exposure to the fire box temperature as proposed early in the development of stoker controls. Were such sensing wires available, there is no suitable insulation available to prevent electrical shorts from affecting the wires and their operation in the system if exposed to the fire box temperature. Had a ceramic bobbin been provided to eliminate the need for insulation, no ceramic, at high temperatures, can withstand the rough treatment a device of the present type must in its association with a stoker fired furnace.

In the present device, the only ceramic is in the terminal block 23, and thus may be, for example, a ceramic material known commercially as "Steatite." The other elements or members, 20, 21 and 35 are preferably made of a suitable rugged heat conducting material such as cold rolled steel. With the arrangement of the elements as shown and described, it is possible to use a temperature sensitive resistance wire that is commercially available and this wire with its glass fibre insulation may be wound directly on the metallic bobbin 35 without danger of the temperature of the bobbin reaching a temperature which will break down the insulation or cause the cracking or crystallization of the resistance wire. The forming of the members 20, 21 and 35 in a hollow cylindrical form presents a large surface area for picking up heat and maximum strength in all directions with small thermal mass to slow down response of the device to temperature changes in the fire box temperature. The element has the further advantage of not too great response to temperature fluctuations as caused by such as the opening of the fire door. Were the element not located as it is within the member 20 but instead upon the member 21 or within the member 21, the opening of the fire door, or other activity causing fluctuations in the air about the element, would cause unwanted variations in the temperature of the resistance element.

From the foregoing it will be seen that there has been provided a temperature pickup element that is rugged in construction and still capable of giving an accurate and fast measurement of temperature, which temperature may be far higher than that which the normal element is capable of withstanding. While a particular embodiment of the invention is shown, it is to be understood it is for illustrative purposes only and I therefore intend to be limited solely by the scope of the appended claims, in which I claim:

1. An elongated combustion temperature pickup element adapted to extend through a panel member into an area of relatively high temperature, the combination comprising, a first hollow cylindrical member adapted to extend into the area whose temperature is to be measured, a supporting member comprising a further hollow cylindrical member having an inside diameter substantially equal to the outside diameter of said first member, said supporting member overlapping said first member sufficiently to rigidly support the latter, a third hollow cylindrical member having an outside diameter which is substantially equal to the inside diameter of said first member and extending from within a portion of said first member to the outer end of said supporting member, said third and supporting members having a space therebetween from the point where said third member extends from said first member to said outer end, an insulating terminal block attached to said third member, and a temperature sensitive resistance wire wound about said third member in said space and terminating in said terminal block, said resistance wire adapted to be heated by heat conduction through said third member and by heat radiation from said supporting member.

2. An elongated temperature pickup element adapted to extend through a panel member into an area of relatively high temperature, the combination comprising, a first hollow cylindrical member adapted to extend into the area whose temperature is to be measured, a supporting member comprising a further hollow cylindrical member having an inside substantially equal to the outside diameter of said first member, said supporting member overlapping said first member sufficiently to rigidly support the latter, a third hollow cylindrical member having an outside diameter which is substantially equal to the inside diameter of said first member and extending from within a portion of said first member to the outer end of said supporting member, said third and supporting members having a space therebetween from the point where said third member extends from said first member to said outer end, an insulating terminal block attached to said third member, a first spacer member circumferentially affixed to said third member to prevent said member from moving inwardly within said first member, a second spacer member formed over the outer end of said third member forming with said third member a supporting means for said terminal block, and a temperature sensitive resistance wire wound around said third member between said spacers and in said space and connected to said terminal block, said resistance wire adapted to be heated by heat radiation from said supporting member and by heat conduction through said third member as heat from the area whose temperature is being measured circulates by convection inside said first and third members to give an indication of the temperature in said area.

3. An elongated temperature pickup element adapted to extend into an area of relatively high temperature and an area of relatively low temperature through a panel which defines the boundary between said areas, comprising a first member extending into the area of relatively high temperature, a further member mechanically engaging and supporting said first member and extending into the area of relatively low temperature, a temperature sensitive resistance wire positioned in heat exchange relation to said further member so that heat from said first member passing through said further member will affect said wire, and means supporting said further member so that a minimum of heat will be conducted to the panel through which the element passes, said means comprising a pair of expansible frustro-conical members adapted to act on either side of the panel and gripping said further element to rigidly retain said element in position.

4. An elongated temperature pickup element having a portion thereof adapted to extend into an area of relatively high temperature wherein a temperature is to be measured and a further portion adapted to extend into an area of relatively low temperature, comprising, a hollow metallic member adapted to project into the area of high temperature, a temperature sensitive resistance wire located in heat conductive relation to said member and wound within that portion of the element normally in the area of relatively low temperature, and a further hollow metallic member surrounding said resistance wire connected in heat conductive and supporting relation to said first member, the major portion of said second member normally extending in the area of relatively low temperature.

5. An elongated temperature pickup element, comprising, a temperature sensitive resistance wire, a first hollow cylindrical member having said wire wound thereon, and a second hollow cylindrical member supporting and surrounding a portion of said first member, said second member being normally disposed in heat conducting relation to said first member and having an open end so that a heat circulating path extends through both of said members to maintain the speed of temperature response at a relatively high value.

6. An elongated temperature pickup element adapted to extend through a panel into an area of relatively high temperature, comprising, a hollow cylindrical member adapted to extend through the panel, and means adapted to support said member in the panel to prevent radial and axial movement thereof, said last named means comprising a split metallic frustro-conical member with a single tightening means located intermediate the ends thereof, the smaller end thereof bearing on said cylindrical member and the larger end thereof adapted to bear on the panel so that a minimum of heat will be conducted from said cylindrical member to the panel.

7. An elongated temperature pickup element comprising, a temperature sensitive resistance wire, a first hollow cylindrical member having said wire wound thereon, and a second hollow cylindrical member supporting said first member at one position and surrounding in spaced relation that portion of said first member wherein said wire is wound, said second member making heat conductive contact with said first member and arranged so that an open heat conducting passage extends from the end of said element through said first member to maintain the speed of temperature response at a relatively high value.

JOSEPH D. DONNA.

REFERENCES CITED

The following references are of record in the file of this patent:

UNITED STATES PATENTS

| Number | Name | Date |
|---|---|---|
| 1,219,629 | Davenport | Mar. 20, 1917 |
| 1,225,368 | Severy | May 8, 1917 |
| 1,767,586 | Hudson | June 24, 1930 |
| 2,091,107 | Reichmann | Aug. 24, 1937 |
| 2,139,640 | Mall et al. | Dec. 6, 1938 |
| 2,271,975 | Hall | Feb. 3, 1942 |
| 2,355,680 | Ruben | Aug. 15, 1944 |
| 2,363,075 | Mattern | Nov. 21, 1944 |
| 2,372,212 | Lewin | Mar. 27, 1945 |
| 2,415,187 | Moore | Feb. 4, 1947 |

FOREIGN PATENTS

| Number | Country | Date |
|---|---|---|
| 421,489 | Great Britain | Dec. 21, 1934 |
| 470,921 | Great Britain | Aug. 24, 1937 |